United States Patent [19]

Hancocks

[11] Patent Number: 5,305,972
[45] Date of Patent: Apr. 26, 1994

[54] CABLE SUSPENDED CHIPPER SYSTEM

[76] Inventor: Larry R. K. Hancocks, Site 8 Comp. 88, R.R. #1, Tampen, B.C., Canada, V0E 2X0

[21] Appl. No.: 99,821
[22] Filed: Jul. 30, 1993
[51] Int. Cl.⁵ .............................................. B64D 47/00
[52] U.S. Cl. ................... 244/118.1; 144/3 D; 144/2 Z; 144/337; 241/101.7; 241/152.2
[58] Field of Search ............... 244/118.1, 137.4, 137.2, 244/137.1, 136, 1 R; 56/235, 11.7, DIG. 9, 336; 144/335, 364, 370, 337, 3 D, 2 Z; 30/379.5; 241/101.7, 152.2, 228, 235, 159

[56] References Cited

U.S. PATENT DOCUMENTS

| | | |
|---|---|---|
| 2,707,008 | 4/1953 | Bannister . |
| 3,394,744 | 7/1968 | Vit ........................ 144/337 |
| 3,536,113 | 10/1970 | Sutherland . |
| 3,576,203 | 4/1971 | Cote . |
| 3,651,845 | 3/1972 | Propst ...................... 144/337 |
| 3,997,135 | 12/1976 | Peterson ................... 244/137.1 |
| 4,121,777 | 10/1978 | Kilstad et al. ............... 241/58 |
| 4,662,414 | 3/1987 | Fandrich . |
| 4,815,263 | 3/1989 | Hartung . |
| 4,984,757 | 1/1991 | Hartung . |
| 5,042,727 | 8/1991 | Plante . |

Primary Examiner—Galen L. Barefoot
Attorney, Agent, or Firm—C. A. Rowley

[57] ABSTRACT

A cable suspended chipper system includes a suspension cable for supporting a system which includes a pair of chipper drums mounted to rotate on spaced parallel axes. A tapered inlet passage directs the tree top toward the nip formed by the chipper drums as the system is lowered onto a tree top. Delimber rods are arranged around the periphery of the inlet to the tapered passage sever the limbs from the tree to facilitate chipping and feeding of the tree into the chipper drums. The drive motor or prime mover for the system is position on the side of the chipper drums opposite to that of the inlet passage from the chipper drums.

12 Claims, 3 Drawing Sheets

CABLE SUSPENDED CHIPPER SYSTEM

FIELD OF THE INVENTION

The present invention relates to a chipping system, more particularly the present invention relates to a chipper system suspended via a cable from a suitable support such as a helicopter or a crane tower.

BACKGROUND OF THE PRESENT INVENTION

There are many application where it is desirable to reduce the height of a tree to protect the tree from more severe damage, for example being blown down, by reducing the height of the tree. Such systems would be particularly useful to protect the ecology particularly adjacent to creeks where blow down is likely to be detrimental to the fish life in the creek or along hydroelectric lines or at the edges of clear-cuts or in any suitable location where tall trees maybe subjected to relatively high wind forces that may topple the tree and cause significant damage, not just to the tree, but also to its immediate surroundings. Also when fighting forest fires in remote regions it would be desirable to apply equipment to selectively eliminate trees by reducing them to chips.

The concept of clipping the top off a tree is not new, for example, U.S. Pat. No. 3,536,113 issued Oct. 27, 1977 to Southerland, discloses a boom mounted cutting head for tree topping, delimbing and bucking system wherein the delimber and cut off mechanism are supported at the free end of a boom and are moved down the tree to first top the tree and then delimb and buck the tree into sections as the head is lowered.

U.S. Pat. No. 3,576,203 issued Apr. 17, 1971, to Cote, discloses a similar device but wherein a chipper is used in place of the bucking mechanism, the chipper is forced to downwardly onto the top of tree to reduce the tree to chips or shavings. The particular mechanism used includes a delimber coupled to a pencil sharpener-like chipper that reduces a standing tree to chips.

U.S. Pat. No. 5,042,727 issued Aug. 27, 1991 to Plante, discloses a similarly mounted bush wood chipper that incorporates flails in the form of pivotal cutting blades that break the tree, particularly the bush, into a plurality of discrete wood particles (chips) and eliminates the tree to ground level.

In all the above described devices, the cutting or chipping systems require rigid support of the cutting mechanism and thus, a relatively rigid (as opposed to a free slung support) must be used to absorb the torque applied to rotate the cutting head.

It is also known to suspend tree cutting elements from helicopters by various means. One of the earlier devices for heli-transport is shown in U.S. Pat. No. 2,707,008 issued Apr. 26, 1955 to Bannister, wherein a gripping element and a cut off mechanism are separately cable supported from the helicopter. One is to griping element grips the top of a tree while the cut off mechanism is lowered to the base of the tree and cuts the tree at its base. After the tree has been cut off it is lifted above the other trees and carried via the gripping element it to the desired location. Obviously, there will be a problem in lowering the cut off mechanism to the base of the tree in a position to cut off the tree, since it would have to drop down between adjacent trees and be positioned adjacent to the base of the tree to be cut.

In a more recent patent, namely, U.S. Pat. No. 4,662,414 issued May 5, 1987 to Fandrich, there is disclosed a system of cutting off and collecting the tree tops. The cut off system is supported from a helicopter and includes a catch basket to catch the sheered off top and permit it to be transported away via the helicopter, i.e. the whole unit is lowered by the helicopter over the top of the tree, a sheer is activated to cut the top of the tree off, the top topples into a basket and is then carried away. This system is used for gathering cones for replanting and only short lengths can be moved.

U.S. Pat. No. 4,815,263 issued Mar. 20, 1989 to Hartung et al., describes a delimber system that is suspended via a semirigid pole from the bottom of a helicopter and is provided with a plurality of rotating (circular) saws, each blade being substantially parallel to the next and arranged in a substantially vertical plane so that when moved passed tree, the blades cut the branches off along the line formed by the saw blades. Obviously, this system cannot be freely suspended via a cable or the saw blades would tend to rotate around the axis of the cable and their relative positions would not be fixed and the effectiveness of the system would be eliminated.

U.S. Pat. No. 4,984,757 issued Jan. 15, 1991 to Hartung, discloses a particular mounting mechanism for suspending a cut-off device such as a circular saws of U.S. Pat. No. 4,815,263 referred to above and pivot the mounting system into position 90° to the normal cutting positioning i.e. to a substantially horizontal position for landing. It will be apparent that while some cut-off devices will be suitable for eliminating a tree, such mechanisms are generally not practical for cable support from a helicopter and either result in cutting the top of a tree as a whole which could damage the forest floor or requires relatively complicated and heavy mechanism for carrying the tops off and then is limited to short lengths. Nothing has been provided that can be transported to remote areas e.g. by suspension via a cable from a helicopter to chip the tree from the top down to reduce the height of the selected standing tree and distribute suitably sized chips or flakes onto the forest floor.

BRIEF DESCRIPTION OF THE PRESENT INVENTION

It is an object of the present invention to provide a cable suspended chipper system that is relatively stable and permits selective topping of trees or eliminating substantially the whole tree by breaking the wood down in small chips which may be rained down on the forest floor with causing significant damage to the surrounding forest.

Broadly, the present invention relates to a chipper system including a suspension cable connected in supporting relationship to the system, a drive means, a pair of chipper drums mounted to rotate about spaced parallel axes, means defining a tapered inlet passage for directing tree tops entering said passage toward and between said drums, said tapered inlet passage having a wide entrance located below said drums when said system is supported on said cable, and delimber means defining the circumference of said entrance to said tapered passage.

Preferably, said delimber means will comprise two pairs rotating delimber rod each of which is provided with delimbing means, each pair of delimbers defining a pair of opposite sides of said entrance.

Preferably, said system will include steering means for steering said system.

Preferably, one of said pair of rod delimbers will have their longitudinal axes substantially parallel to the axes of said drums and the other of said pair of delimber rods will have their axes substantially perpendicular to said axes of said drums.

Preferably, the spacing between said other pair of rod type delimbers will be substantially equal to the longitudinal length of said drums and said rods of said other pair will be substantially vertically positioned below the axial end of said drum and wherein said rods of one pair of delimber rods will be spaced wider than the spacing between said axes of said drums.

BRIEF DESCRIPTION OF THE DRAWINGS

Further features, objects and advantages will be evident from the following detailed description of the preferred embodiments in the present invention taken in conjunction with the accompanying drawings in which.

DESCRIPTION OF THE PREFERRED EMBODIMENTS

Figure 1:
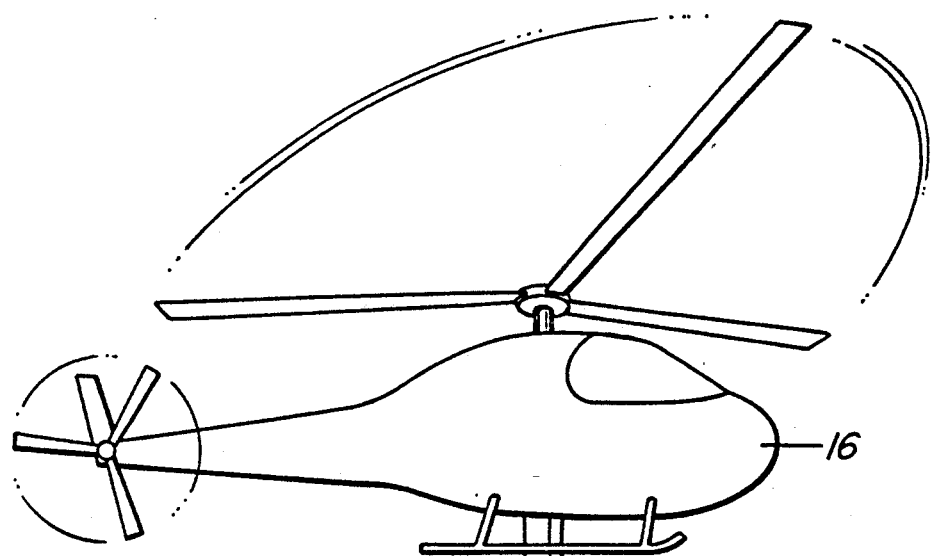
FIG. 1 is a schematic illustration of the chipper system suspended from a helicopter and positioned in chipping relationship to a tree being topped.
Figure 1:
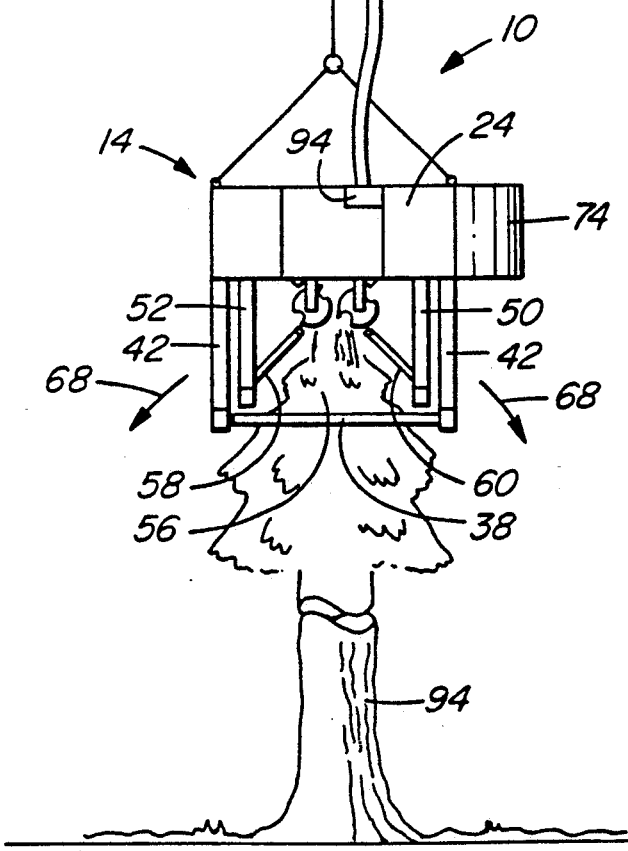

In FIG. 1, the system 10 of the present invention includes a cable 12 from which the operating mechanisms 14 of the chipper system 10 are suspended from a suitable carrier such as the helicopter 16. The suspension cable 12 is connected to the framework 18 of the operating system 14 via cables 22 extending one from each corner of frame 20 to form a suspension wherein the cable 12 connects with the cables 22 in overlying relationship to the centre of gravity of the unit 14.

The chipper unit 14 is formed with an upper housing 24 in which is mounted the prime mover 26 schematically indicated by the compartment 26.

Also positioned within the housing 24 is a drive mechanism 28 schematically indicated by the compartment 28. This drive mechanism 28 may be a gearbox of the like driving the various instrumentalities, either by chain or shaft drive or may take the form of a hydraulic pump with each of the instrumentalities described herein below, driven by a suitable hydraulic motor. The hydraulic system is preferred.

Suspended below the housing 24 on arms 30 (the arms 30 at one end of the system only are shown) are a pair of substantially parallel chipper drums 32 and 34. As above indicated, these chipper drums 32 and 34 are driven by suitable chain, shaft or hydraulic drive mounted in arms 30.

Positioned below the drums 32 and 30 is a first pair of substantially parallel delimbers e.g. delimber rods 36 and 38 each of which is mounted on a pair of corner posts 40 and 42 (only one of the corner post 40 is shown). The corner posts 40 and 42 have a drive system 44 for driving their respective delimber rods 36 and 38.

A second pair of substantially parallel delimbers e.g. delimber rods 46 and 48 are suspended below the housing 24 each on a pair of suspension posts 50 and 52 respectively (only one post 50 has been shown) These posts 50 and 52 are also provided with drive systems 54 to drive their respective delimber rods 46 and 48. The delimbers 46 and 48 are mounted above, i.e. closer to the drums 32 and 34 then the delimbers 36 and 30.

Each of the delimber rods 36, 38, 36 and 48 is provided preferably with substantially axially extending delimber knives 51 (see FIGS. 2 and 3) that cut off the limbs.

The delimbers are arranged in a rectangular pattern to define the inlet to an inlet a passage 56. The delimbers 36 and 38 define two oppose sides of the inlet to the passage 56, namely the sides at the axial ends of the drums 32 and 34. The delimbers 46 and 48 are substantially parallel to the axes of the drums 32 and 34 and defined the longitudinal (relative to drums 32 and 30) sides of the inlet to the passage 56.

Preferably, the passage 56 will taper toward the nip form,ed between the drums 32 and 34 and will be defined by a pair of converging walls 58 and 60 (see FIGS. 1 and 3) each of which adjacent to its respective chipper drum 32 and 34 respectively is provided with bed plates 59 and 61 respectively to cooperate with the chipper knives 62 on the drums 32 and 34 to chip the tree top should the tree top not be received between the drums 32 and 34.

Figure 3:
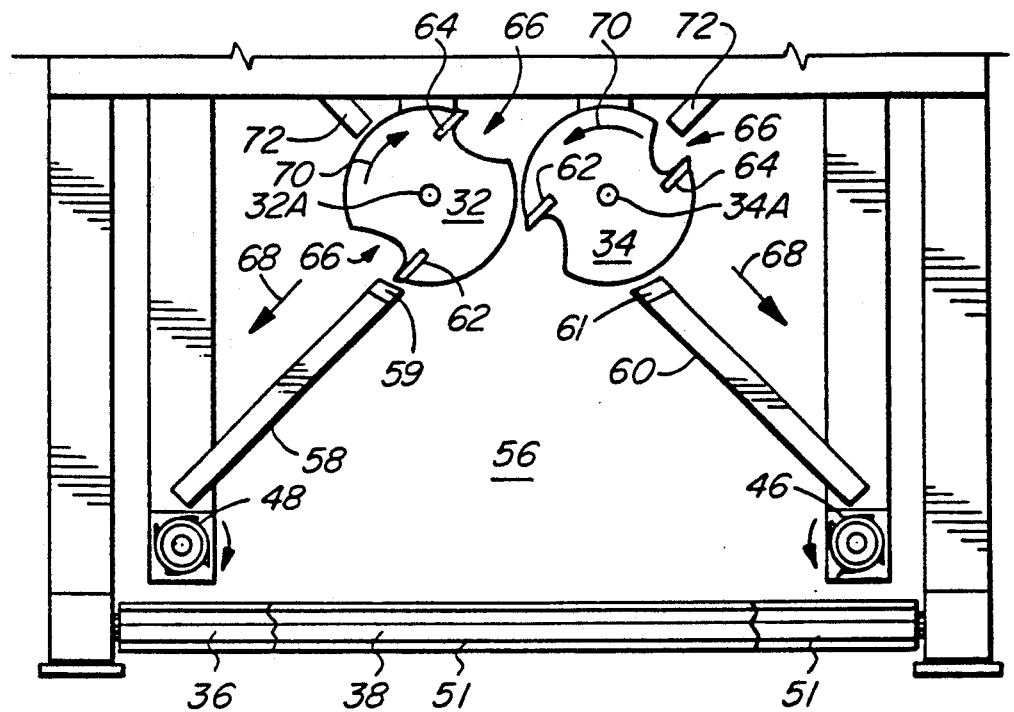
FIG. 3 is a partial horizontal elevation view schematically illustrating the relative positioning of the chipper drums and the delimber rods.

It will be apparent from FIG. 3 that the passage 56 tapers to the midpoint between the longitudinal and rotational axes 32A and 34A of the drum 32 and 34 respectively directing between the drum 32 and 34.

Each of the chipper drum 32 and 34 in the illustrated arrangement comprises substantially cylindrical drum with at least a pair of knives as indicated at 62 and 64 each with a chip pocket 66 leading the knives in the direction of rotation of the respective drums 32 and 34. Chips, as they are cut, are deflected into the pockets 66 and are thrown therefrom when the knives clear the tree and maybe thrown either on the inside of the partition walls 58 and 60 or more likely on the outside, and clearly on the outside when the chipper knives cooperate with the bed plates 59 or 61 and fall down along the outside of the walls 58 and 60 as indicated by the arrow 68 in FIGS. 1 and 2.

The direction of rotation of the drums 32 and 34 is preferably as indicated by the arrows 70 in FIG. 3 toward each other above their rotational axes 32A and 34A and away from each other at the lower or 6 o'clock position so that the chipper knives 62 and 64 when they engage a tree, tend to apply forces rejecting the tree from the chipper as oppose to drawing it, this better ensures that the chipper does not become wedged on the tree and try to climb down the tree and apply a downward force to the helicopter. However, if desired, the chipper may be made to rotate in the opposite direction. In this case feed control devices are preferably applied to the chipper heads such the as the feed control surfaces used in a Norman type chipper.

When the drums 32 and 34 rotate in the direction illustrated, it is also preferred to provide deflectors 72 extending downwardly from the housing 24 towards the periphery of the chippers 32 and 34 to deflect any chips exiting the pockets 60 away from the bottom of the housing 24 overlying the drums 32 and 34.

Figure 2:
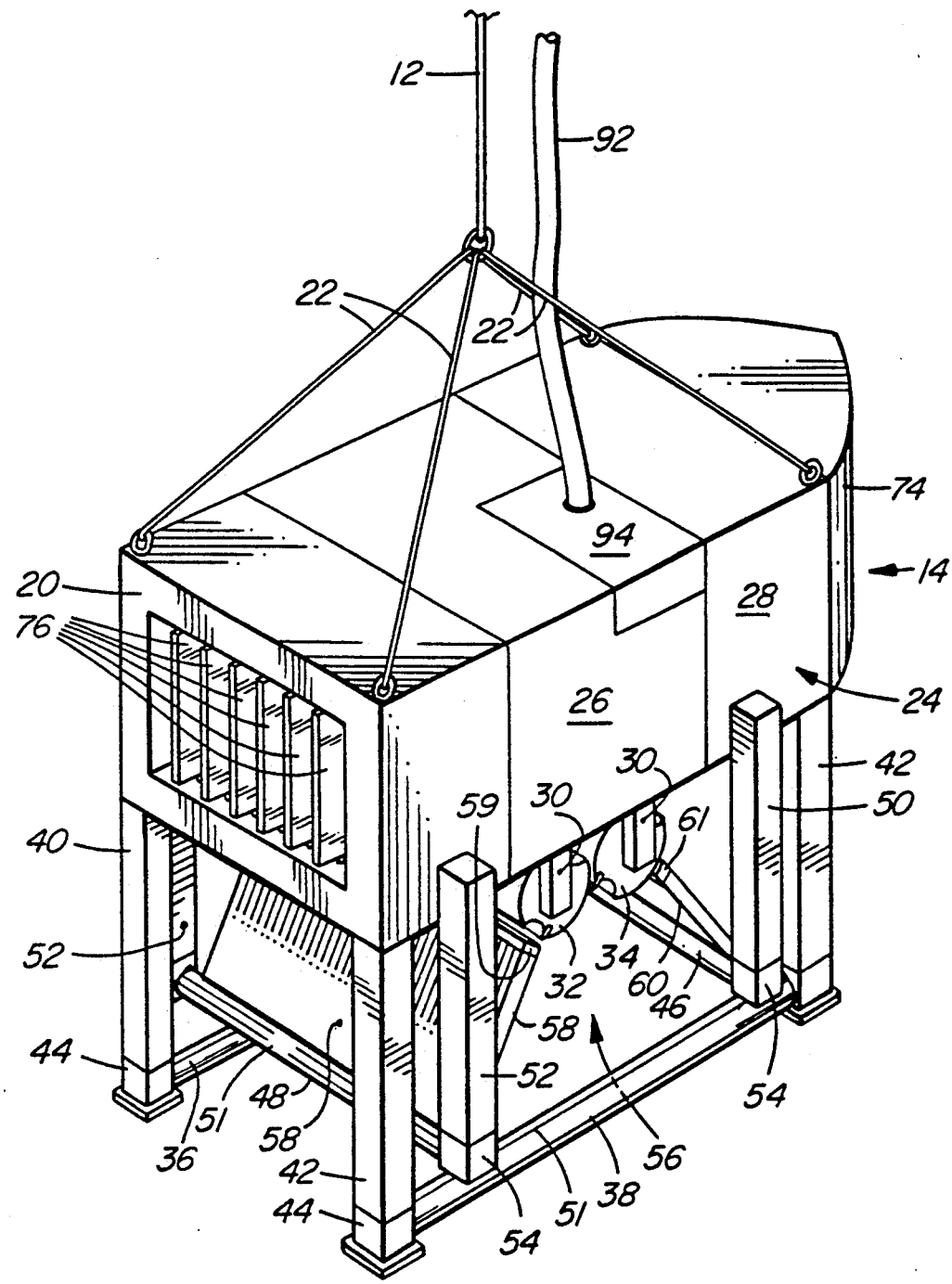
FIG. 2 is a schematic isometric illustration of a chipper system constructed in accordance with the present invention.
Figure 4:
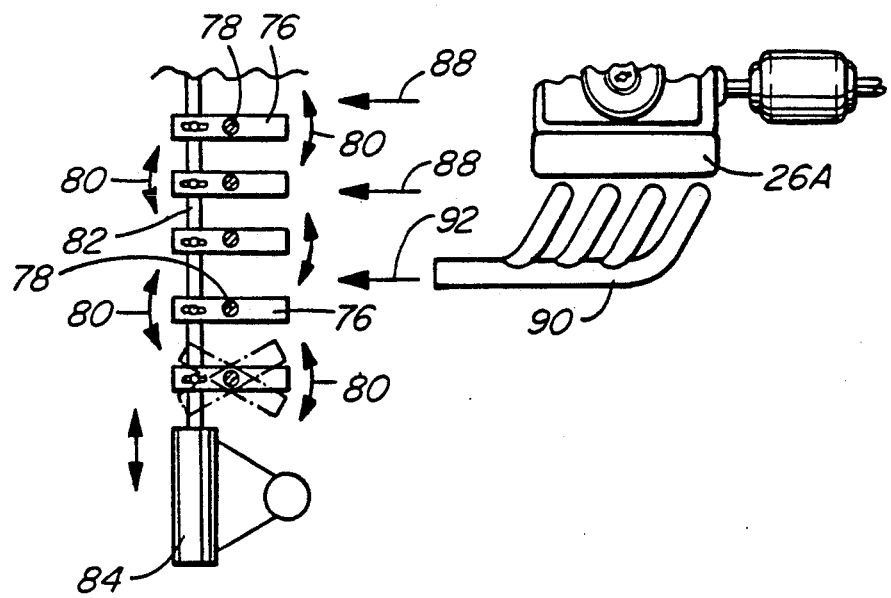
FIG. 4 is a schematic illustration of the steering mechanism that may be used with the chipper system of the present invention.

Referring back to FIGS. 1 and 3, it is also preferred to stabilize the system and to this the housing 24 preferably is provided with a streamline shroud 74 at the front end of the housing 24 (see FIG. 1) and at the rear end of the housing 24 with a plurality of angular adjustable louvre 76 to permit limited steering of the unit (see FIGS. 2 and 4). Each of the louvres 76 is pivotably mounted as indicated by the pivot point 78 for a pivotal movement as indicated by the arrow 80, which movement is attained by axially moving the bar 82 pivotably connected with each of the louvres 76 via a mechanism such as the piston and cylinder 84 which can be controllably operated to rotate all of the louvres 76 simultaneously around their respective pivots 78.

To improve the effectiveness of this steering mechanism the air stream from the cooling fan of the prime mover 26, i.e. as indicated by the arrows 88 is directed toward the louvres 76. Similarly, the exhaust from the exhaust duct 90 is directed as indicated by the arrows 92 toward the louvre 76 so that angularly adjusting of the louvre 76 and the action of the gas streams 88 and 92 permit the system to be steered.

A suitable control 92 cable extends down from the helicopter 16 (see FIGS. 1 and 2) and controls the prime mover 26 (engine 26A) and the operation of the louvres 76, i.e. the cylinder 80 to steer the unit as described.

In operation, as shown in FIG. 1, the helicopter 16 positions the unit 14 immediately over a tree such a tree indicated at 94 and then lowers the unit 14 with the delimber 36, 38, 46, 48 that delimb the tree to permit it to feed to the chipper drums 32 and 34 which are rotated at their required speed to fully chip the tree and dispense the chips as indicated by the arrows 68 to the ground. The rate of descent of the unit 14 is controlled from the helicopter by controlling the out-feed of the cable 12 or by adjusting the height of the helicopter to thereby reduce the height of the tree to that desired.

The chipper drums 32 and 34 have been shown with their rotational axes substantially perpendicular to the stable direction of travel of the unit 14, however they may be mounted perpendicular to the arrangement shown or at any suitable angle to the direction of travel.

Having described the invention, modifications will be evident to those skilled in the art without departing from the scope of the invention as defined in the appended claims.

I claim:

1. A chipper system including a suspension cable connected in supporting relationship to the system, a drive means, a pair of chipper drums mounted to rotate about spaced parallel axes, means defining a tapered inlet passage for directing tree tops entering said passage toward and between said drums, said tapered inlet passage having an entrance located below said drums when said system is supported on said cable, and delimber means defining the circumference of said entrance to said tapered passage.

2. A chipper system as defined in claim 1 wherein said delimber means comprises two pairs rotating delimber rods each of which is provided with delimbing means, each pair of delimber rods defining a pair of opposite sides of said entrance.

3. A chipper system as defined in claim 1 wherein said system includes steering means for steering said system.

4. A chipper system as defined in claim 2 wherein one of said pair of rod delimbers will have their longitudinal axes substantially parallel to the axes of said drums and the other of said pair of delimber rods will have their axes substantially perpendicular to said axes of said drums.

5. A chipper system as defined in claim 1 wherein spacing between said other pair of said rods is substantially equal to the longitudinal length of said drums and said rods of said other pair are substantially vertically positioned below the axial end of said drum and wherein said rods of one pair are spaced wider than the spacing between said axes of said drums.

6. A chipper system as defined in claim 2 wherein said system includes steering means for steering said system.

7. A chipper system as defined in claim 4 wherein said system includes steering means for steering said system.

8. A chipper system as defined in claim 5 wherein said system includes steering means for steering said system.

9. A chipper system as defined in claim 3 wherein said steering means for steering said system comprises a plurality of pivotably mounted louvres and means for controllable moving said louvres.

10. A chipper system as defined in claim 6 wherein said steering means for steering said system comprises a plurality of pivotably mounted louvres and means for controllable moving said louvres.

11. A chipper system as defined in claim 7 wherein said steering means for steering said system comprises a plurality of pivotably mounted louvres and means for controllable moving said louvres.

12. A chipper system as defined in claim 8 wherein said steering means for steering said system comprises a plurality of pivotably mounted louvres and means for controllable moving said louvres.

* * * * *